United States Patent
Shibamoto et al.

(10) Patent No.: US 6,346,973 B1
(45) Date of Patent: Feb. 12, 2002

(54) ELECTROLUMINESCENT PANEL-ATTACHED ELECTRONIC DEVICE

(75) Inventors: Masaaki Shibamoto, Hino; Katsunobu Sakaishi, Hachioji; Masami Hiramoto, Chofu; Hirokazu Saito; Kazuhiro Sugiyama, both of Tokyo, all of (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 08/964,179

(22) Filed: Nov. 4, 1997

(30) Foreign Application Priority Data

Nov. 8, 1996 (JP) ............................................. 8-311227

(51) Int. Cl.⁷ ........................................... G02F 1/1335
(52) U.S. Cl. ......................... 349/69; 379/368; 362/24
(58) Field of Search .......................... 455/90; 349/69; 379/368; 362/24

(56) References Cited

U.S. PATENT DOCUMENTS

| | | | |
|---|---|---|---|
| 5,115,329 A | * 5/1992 | Ikarashi et al. ................ 359/50 |
| 5,235,636 A | * 8/1993 | Takagi et al. ................ 379/368 |
| 5,397,867 A | * 3/1995 | Demeo ........................... 200/5 |
| 5,408,060 A | * 4/1995 | Muurinen ................... 200/314 |
| 5,416,730 A | * 5/1995 | Lookofsky ................ 364/708.1 |
| 5,487,182 A | * 1/1996 | Hansson ....................... 455/90 |
| 5,548,084 A | * 8/1996 | Tracy ........................... 361/818 |
| 5,708,428 A | * 1/1998 | Phillips ........................ 341/22 |
| 5,736,973 A | * 4/1998 | Godfrey et al. .............. 345/102 |
| 5,746,493 A | * 5/1998 | Johnsson et al. .............. 362/24 |
| 5,771,039 A | * 6/1998 | Ditzik ........................ 345/178 |
| 5,847,336 A | * 12/1998 | Thorton ........................... 200/5 |
| 5,847,783 A | * 12/1998 | Hiramoto et al. .............. 349/69 |
| 5,856,030 A | * 1/1999 | Burrows ....................... 428/690 |
| 5,867,772 A | * 2/1999 | Jonsson et al. ................ 455/90 |
| 5,917,562 A | * 6/1999 | Woodgate et al. ............. 349/15 |
| 5,929,961 A | * 7/1999 | Nishi et al. .................. 349/187 |
| 5,971,557 A | * 10/1999 | Kubes et al. .................. 362/24 |
| 5,975,711 A | * 11/1999 | Parker et al. .................. 362/24 |
| 6,011,961 A | * 1/2000 | Kaschke ....................... 455/90 |

FOREIGN PATENT DOCUMENTS

| | | |
|---|---|---|
| EP | 0 537 529 A | 4/1993 |
| WO | WO 93/23842 A | 11/1993 |

* cited by examiner

*Primary Examiner*—Kenneth Parker
(74) *Attorney, Agent, or Firm*—Frishauf, Holtz, Goodman, Langer & Chick, P.C.

(57) ABSTRACT

On the front surface of a single electroluminescent panel, there are provided a display panel, such as a liquid crystal display panel, for controlling transmission of light to perform display, and an operation panel having a plurality of operation switches and substantially transmitting light through at least a portion thereof which requires illumination. When the overall rear surfaces of the display panel and the liquid crystal display panel are adhered to the electroluminescent panel by an adhesive, the vibration sound generated from the electroluminescent panel can be reduced. Further, when an appropriate pigment is diffused into the adhesive, light for illuminating the display panel and the operation panel is adjusted to a desired color.

7 Claims, 6 Drawing Sheets

ELECTROLUMINESCENT PANEL-ATTACHED ELECTRONIC DEVICE

BACKGROUND OF THE INVENTION

This invention relates to an electronic device with an electroluminescent panel.

Electronic devices which have a display section and a key operation section with a plurality of keys (operation switches) include a cellular phone, an electronic calculator, a liquid crystal TV, a radio with a display capable of receiving a teletext multi-plex broadcast, etc. Some of the electronic devices have a structure in which a light emitting diode (LED) is arranged on the rear surface of a transparent operation panel. This LED illuminates the key operation section through the panel to facilitate the key operation even in a dark place.

Since in the conventional electronic devices, the LED performs point emission, only that portion and its vicinity of the panel, at which the diode is mounted, is illuminated. This means that the keys have different brightnesses and hence do not have a good appearance. Moreover, since the LED is attached to the circuit board by soldering, the attached portion becomes locally thick. This is inconvenient for realizing a thin assembly. In addition, when the display section comprises, for example, a liquid crystal display panel which requires a light source, light sources are necessary for both the key operation section and the display section. As a result, the wiring and the mounting structure of the electronic device become complicated, which is a serious obstacle in developing more compact electronic devices.

BRIEF SUMMARY OF THE INVENTION

It is an object of the invention to provide an electronic device having a simplified mounting structure equipped with a display section and an operation section which both require illumination, to thereby reduce the size of the electronic device.

To attain the object, there is provided an electroluminescent panel-attached electronic device comprising: a display panel for controlling transmission of incident light from an outside to perform display; operation panel having an operation switch and capable of substantially transmitting light through at least a portion thereof which requires illumination; and a single electroluminescent panel (hereinafter referred to as "EL panel") provided on a rear surface of each of the display panel and the operation panel for illuminating the display panel and the operation panel.

Since in the above EL-attached electronic device, the display panel and the operation panel can be illuminated by a single thin EL panel, the electronic device with the display panel and the operation panel can have a simple mounting structure and hence a much more compact size.

Preferably, in the EL panel-attached electronic device, the substantially overall rear surface of the display panel is adhered to the EL panel by an adhesive. As a result, the vibration sound generated from the EL panel can be reduced. Further, the emission color of the EL panel can be adjusted by diffusing a pigment into the adhesive.

More preferably, the EL panel-attached electronic device further comprises a flexible circuit board electrically connected to the display panel and the operation panel, and the flexible circuit board is adhered to a rear surface of the EL panel by an adhesive. In this case, it is also preferable that the EL panel is flexible. As a result, an electronic device is obtained in which the display panel section can be folded on the operation panel section.

Further, the EL panel may have an electroluminescent layer herein after referred to "EL layer" formed by diffusing fluorescent material powder into a dielectric layer, and a pair of electrodes holding therebetween the EL layer, and the EL layer may be selectively formed on the display panel and the operation switch.

Also preferably, in the EL panel-attached electronic device, the display panel is a liquid crystal display panel which includes a pair of substrates, each having electrodes and liquid crystal sealed therebetween. In this case, it is also preferable that the pair of substrates of the liquid crystal display panel are flexible electrode substrates obtained by forming electrodes on flexible films.

Further preferably, in the EL panel-attached electronic device, the EL panel has an EL layer formed by diffusing fluorescent material powder into a dielectric layer, and a pair of substrates holding therebetween the EL layer, at least one of the substrates which faces the operation panel being transparent, the substrates having electrodes formed on opposed surfaces thereof, a color adjusting layer for transmitting therethrough light of a desired wavelength being selectively formed on a predetermined portion of a front surface or a rear surface of the transparent at least one of the substrates. As a result, multi-color illumination can be performed.

In addition, the structure of the EL panel-attached electronic device is applicable to a cellular phone.

Another object of the invention is to simplify the assembled structure of an electronic device equipped with a liquid crystal display panel and another display section which both require illumination, to thereby reduce the size of the electronic device.

To attain this object, there is provided an EL panel-attached electronic device comprising: an EL panel having an EL layer held between a pair of substrates which have electrodes formed on opposed surfaces thereof; a liquid crystal display panel provided on a predetermined surface portion of the EL panel, having liquid crystal sealed between the substrates, each provided with an electrode, and capable of controlling the transmission of light by changing orientation of liquid crystal molecules; and an EL display section formed on a surface portion of the EL panel other than the predetermined surface portion, the electroluminescent display section performing display by light emitted from the electroluminescent panel.

Since in the above EL-attached electronic device, the liquid crystal display panel and another display section can be illuminated by a single thin EL panel, the electronic device with a plurality of display sections including the liquid crystal display panel can have a simple mounting structure and hence a much more compact size.

Yet another object of the invention is to provide a compact electronic device including an operation panel with a plurality of operation switches which can be uniformly illuminated in a dark place.

To attain the object, there is provided an EL panel-attached electronic device comprising: an operation panel having a plurality of operation switches and substantially transmitting light through at least a portion thereof which requires illumination; and an EL panel provided on a rear surface of the operation panel and formed by holding an EL layer between a pair of substrates which have electrodes formed on opposed surfaces thereof, at least one of the substrates which is positioned on the side of the operation panel being transparent.

Since in the above EL panel-attached electronic device, the EL panel uniformly illuminates the substantially overall rear surface of the operation panel, all operation switches can be uniformly illuminated and therefore easily operated in a dark place.

In the above-described El panel-attached electronic device, it is preferable to selectively provide a color adjusting layer for transmitting therethrough light of a desired wavelength, on a predetermined portion of a front surface or a rear surface of the transparent at least one of the substrates. As a result, the operation switches of the operation panel can be illuminated with light of any desired color, which enhances the commercial value of the electronic device.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the invention will be described in detail with reference to the accompanying drawings.

Figure 1:
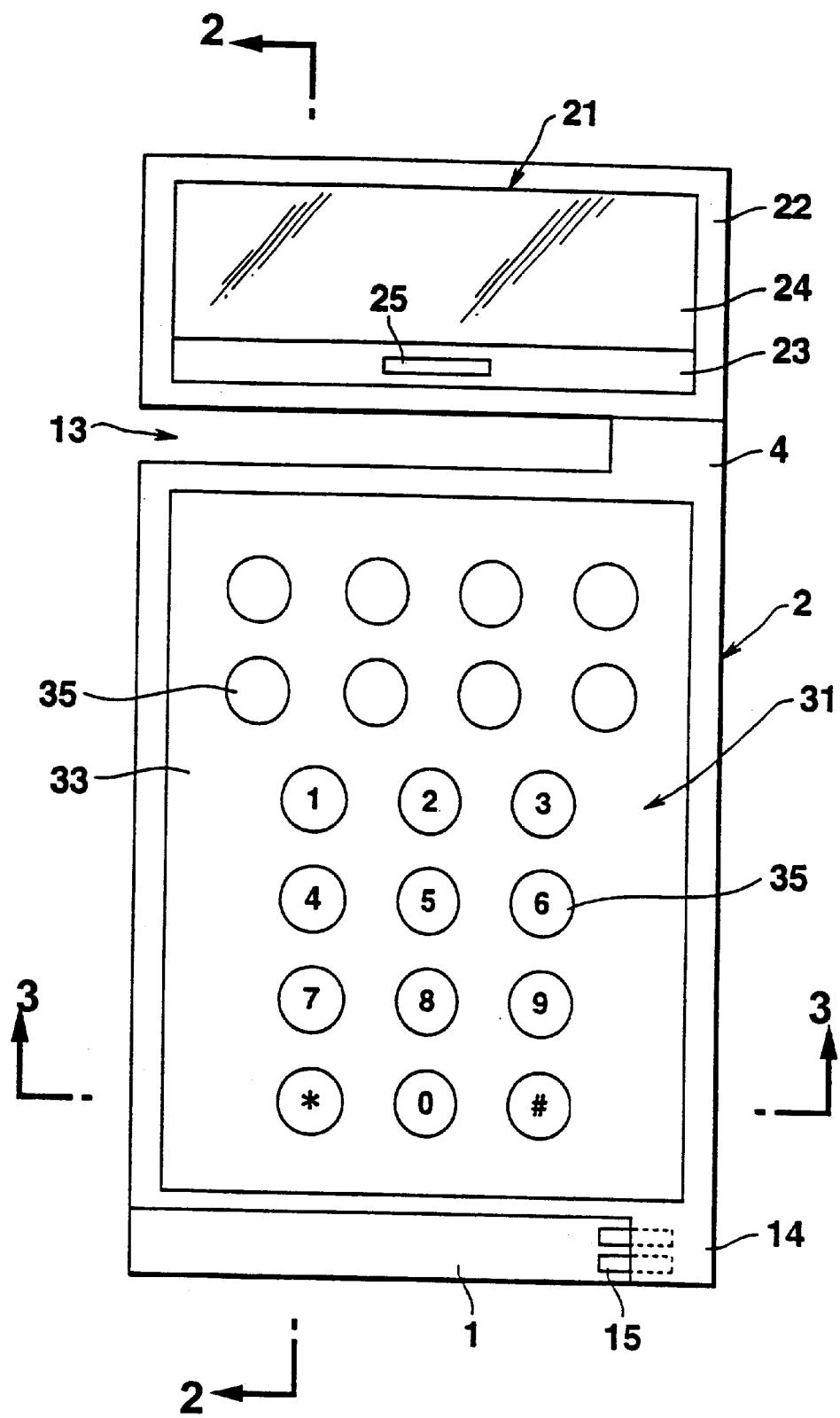
FIG. 1 is a plan view, showing part of a cellular phone to which the invention is applied.
Figure 2:
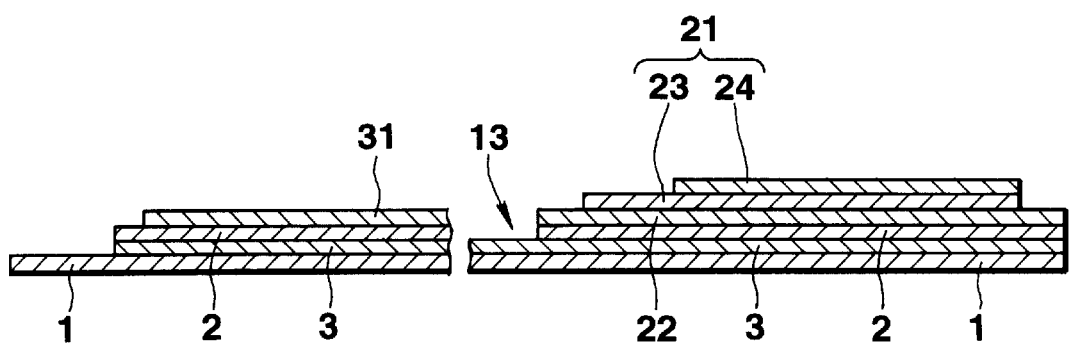
FIG. 2 is a sectional view, taken along lines 2—2 of FIG. 1.
Figure 3:
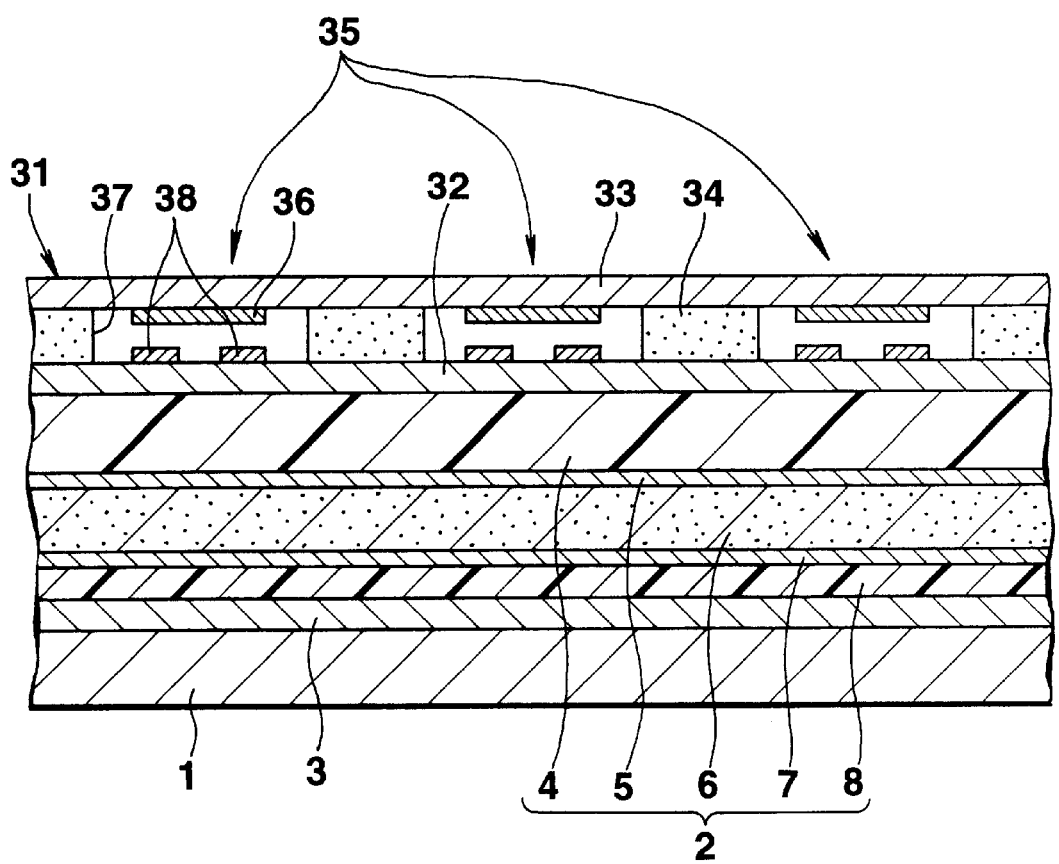
FIG. 3 is a sectional view, taken along lines 3—3 of FIG. 1.

FIGS. 1–3 show an essential part of a cellular phone to which the invention is applied. The cellular phone has a flexible circuit board 1. An EL panel 2 is adhered to the front circuit board 1 by means of an adhesive member 3 formed of, for example, a double coated adhesive tape. The EL panel 2 has a structure comprising a transparent electrode 5 made of ITO (Indium Tin Oxide), etc. provided on the rear surface of a flexible and transparent film substrate 4 made of PET (Polyethylene Telephtalate), etc., an EL layer 6 attached to the rear surface of the transparent electrode 5, formed by diffusing fine particles of phosphor in a dielectric layer, a back electrode 7 made of carbon, etc. is provided on the rear surface of the EL layer 6, and a protective film 8 provided on the rear surface of the back electrode 7.

Figure 4:
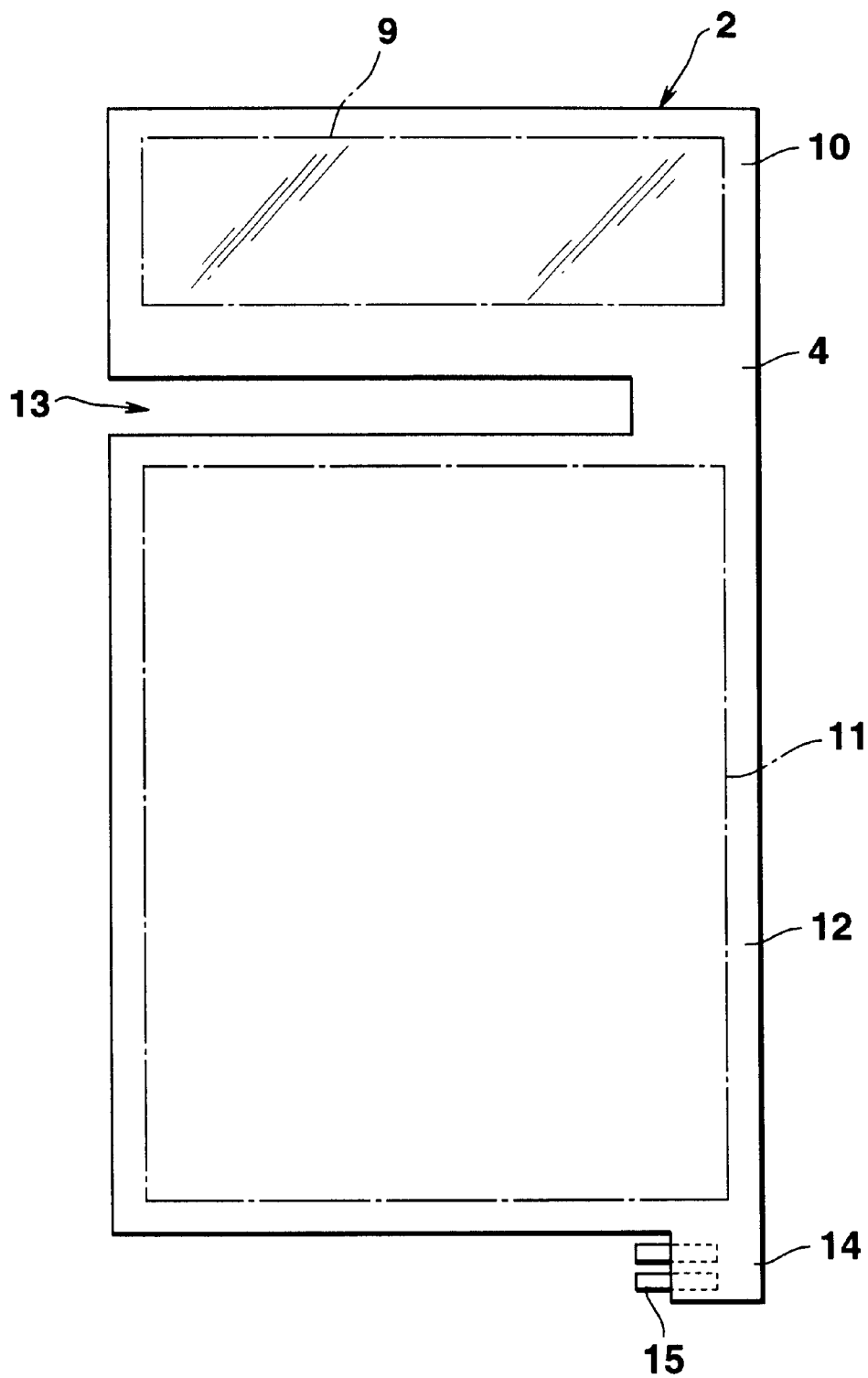
FIG. 4 is a plan view, showing an EL panel incorporated in the phone of FIG. 1.

As is shown in FIG. 4, the EL panel 2 has a structure in which a predetermined gap 13 is provided between an upper panel section 10 with an upper emission area 9 and a lower panel section 12 with a lower emission area 11, and a connecting portion 14 is provided at a lower right portion of the lower panel section 12. The connecting portion 14 has two connecting pins 15 connected to the transparent electrode 5 and the back electrode 7 shown in FIG. 3. The other ends of the connecting pins 15 are connected to connecting terminals (not shown) of the circuit board 1.

A liquid crystal panel 21 is adhered to the upper emission area 9 of the EL panel 2 via an adhesive member 22 formed of, for example, a transparent double coated adhesive tape. Since the overall rear surface of the liquid crystal panel 21 is adhered to the upper emission area 9, the vibration sound generated from the EL panel 2 can be weakened. More specifically, the EL panel 2 slightly vibrates and generates small sound during emission. This vibration is absorbed in the adhesive members 3 and 22, thereby weakening the vibration sound.

The liquid crystal panel 21 has a structure in which a pair of electrode plates 23 and 24 are adhered to each other via a seal member (not shown) with their electrode-formed faces opposed, and in which liquid crystal (not shown) is sealed between the electrode plates. Each of the electrode plates 23 and 24 is obtained by forming an electrode of a predetermined pattern on a glass substrate (or a flexible resin film). The lower end of the glass substrate 23 which is located on the rear side projects from the lower end of the front-side glass substrate 24. A semiconductor chip 25 consisting of, for example, an LSI is mounted on a projecting portion of the glass substrate 23 for driving the liquid crystal panel 21, as is shown in FIG. 1.

An operation panel 31 is mounted on the lower emission area 11 of the EL panel 2. As is shown in FIG. 3, the operation panel 31 has a spacer 34 interposed between two transparent film substrate 32 and 33 and having the number of openings or through holes 37 which correspond to the number of operation keys or switches 35. When any key 35 on the front-side film substrate 33 is pushed by, for example, a finger, a movable contact 36, which is dedicated to the key, made of, for example, ITO and provided on the portion of the rear surface of the front-side film substrate 33, in the opening 37, is brought into contact with a pair of stationary contacts 38 made of, for example, ITO and provided on the rear-side film substrate 32 within a corresponding opening 37 of the spacer 34. Thus, the movable contact 36 electrically connects the stationary contacts 38. On the portions of the front surface of the front-side surface, corresponding to the respective keys 35, desired letters, marks and/or symbols are printed with paints of the same or different colors. Further, in this embodiment, the operation panel 31 is laminated on the EL panel 2 and fixed thereto by means of a case (not shown). Alternatively, the operation panel 31 and the EL panel 2 may be adhered to each other by an adhesive. If in this case, the overall rear surface of the operation panel 31 is adhered to the EL panel, the EL panel 2 is held between adhesives, like the upper emission area 9, with the result that the vibration sound of the EL panel 2 can be more remarkably weakened.

Since in the above-described cellular phone, the EL panel 2 as a plane light emitting source is provided on the rear surface of the operation panel 31, all keys 35 of the operation panel 2 can be uniformly illuminated in a dark place so that the printed letters, works and the like are clearly displayed. This means that the cellular phone can have a good appearance. Moreover, since the EL panel 2 is also attached to the rear surface of the liquid display panel 21, this panel can be uniformly illuminated, too. Furthermore, by virtue of the EL panel 2, the cellular phone can be made thinner, lighter and more compact than the conventional one which uses an emission diode. In addition, since the connection pins 15 are sufficiently separated from the liquid crystal panel 21, the inverter circuit for obtaining a voltage to be applied to the EL panel 2 can also be sufficiently separated from the liquid crystal panel 21, thereby minimizing the adverse influence of the noise of the inverter circuit upon the display panel.

The luminescent color of the EL panel 2 can be changed by changing a pigment to be diffused into the EL layer 6. In this case, the upper emission area 9 and lower emission area 11 of the EL panel 2 may be set at the same color or different colors.

Figure 5:
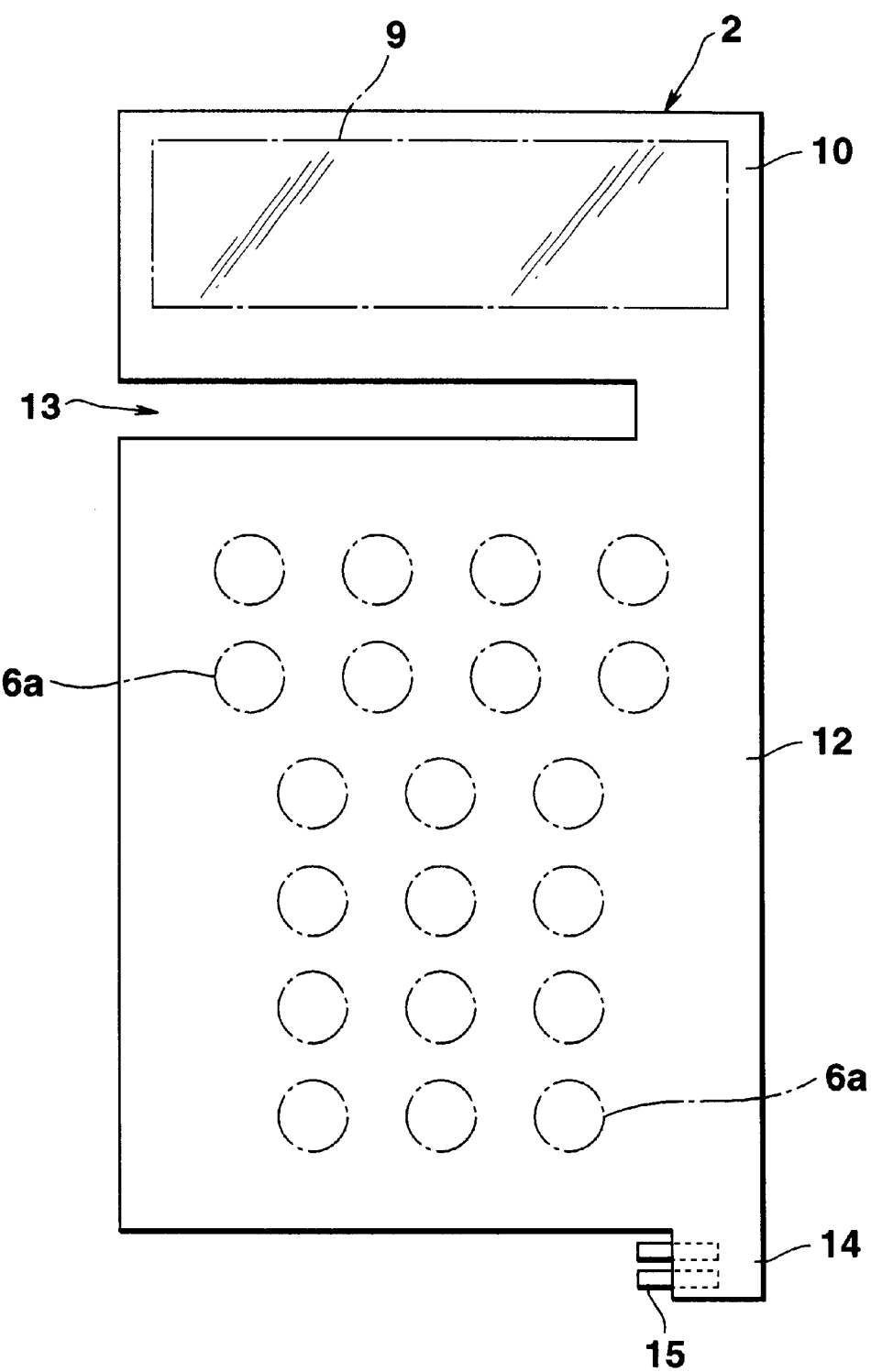
FIG. 5 is a plan view, showing a modification of the EL panel.

Furthermore, the EL layer 6 of the EL panel 2 can be partially formed by printing. For example, as is shown in FIG. 5, an EL layer 6a can be selectively formed on that portion of the lower panel section 12 of the EL panel 2, which corresponds to each key 35 of the operation panel 31 shown in FIG. 1. In this case, the luminescent color can be changed, for example, in units of one row of the keys 35 by diffusing different pigments into EL layers 6a for corresponding key rows.

Figure 6:
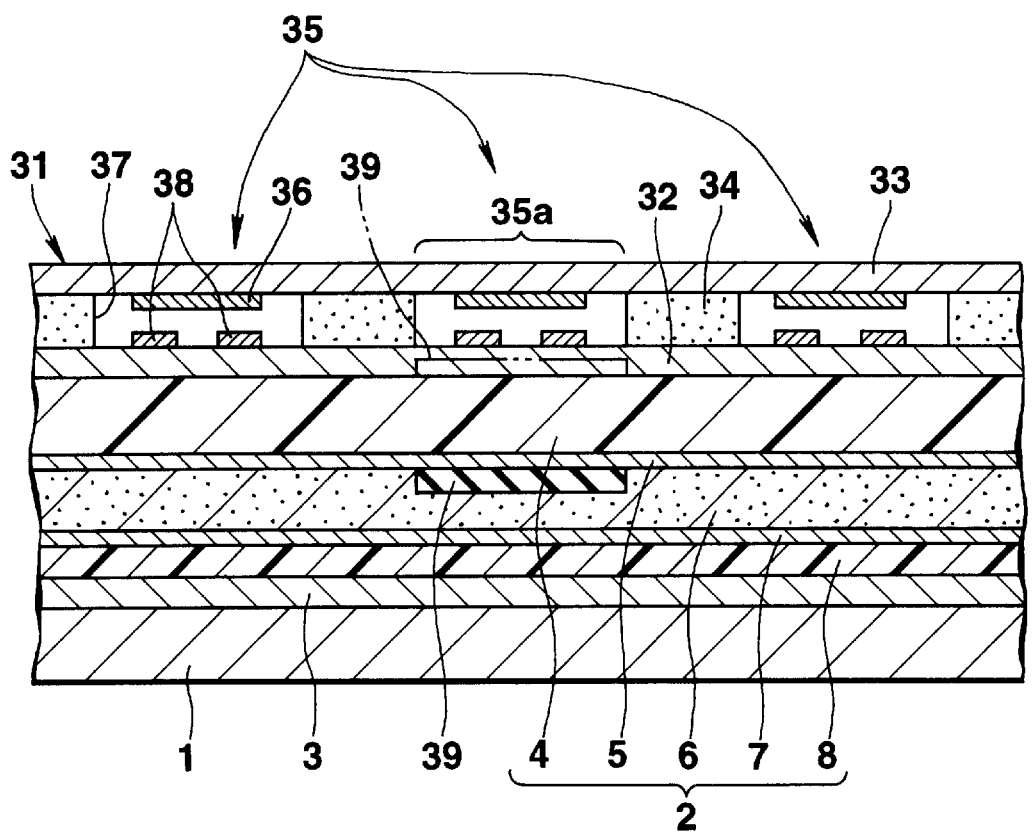
FIG. 6 is a plan view, showing another modification of the EL panel.

Although in the above embodiment, a pigment or pigments are diffused into the EL layer 6 of the EL panel 2, the invention is not limited to this. Instead, the pigment may be diffused into the adhesive 22 which adheres the liquid crystal panel 21 to the El panel 2. Further, like a modification of the embodiment as shown in FIG. 6, a color adjusting layer 39 made of a transparent resin material and doped with a desired color pigment may be formed, by e.g. printing, on a necessary rear surface portion of the film substrate 4 of the EL panel 2 (in the modification of FIG. 6, for example, on that rear surface portion of the film substrate which corresponds to a center key 35a). Alternatively, the color adjusting layer 39 may be formed on a desired front surface portion of the film substrate 4.

Although in the embodiment, the overall rear surface of the liquid crystal display panel 21 is adhered to the EL panel 2 by the adhesive 22, only a peripheral portion or predetermined opposite side portions of the rear surface of the panel 21 may be adhered to the EL panel 2.

Moreover, the liquid crystal display panel 21 may be formed by sealing liquid crystal between flexible film electrode substrates, which are obtained by forming electrodes on a pair of transparent flexible film substrates. In the case of using the film electrode substrates, the resultant cellular phone can be made thinner and lighter than the case of using the glass electrode substrates 23 and 24.

Further, if the EL panel is formed of a flexible substrate and the circuit board is formed of a flexible member such as an FPC, the display panel section and the operation panel section are coupled such that they can be folded on each other.

In addition, although in the embodiment, a single EL panel illuminates the liquid crystal display panel and the operation panel, the invention is not limited to this. The invention is also applicable to an EL panel-attached electronic device equipped with a plurality of display sections. For example, one of them is a section of the liquid crystal display panel and another one is an electroluminescent display section which performs display by light emitted from the EL panel. The electroluminescent display section is formed on a surface portion of the EL panel other than a predetermined surface portion where the liquid crystal display panel is provided. In this case, the EL panel with EL layers which are selectively formed is preferably used.

The EL panel of the invention is not limited to the above-described one in which the EL layer is formed of a dielectric material mixed with fluorescent material, but may contain an organic material as an emission material in the EL layer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An electroluminescent panel-attached electronic device comprising:

a display panel for controlling transmission of incident light from outside to perform display;

an operation panel having an operation switch and substantially transmitting light through at least a portion thereof which requires illumination; and a single electroluminescent panel for illuminating the display panel and the operation panel, the single electroluminescent panel being adhered to a substantial overall rear surface of each of the display panel and the operation panel by an adhesive including a pigment.

2. The electroluminescent panel-attached electronic device according to claim 1, further comprising a flexible circuit board electrically connected to the display panel and the operation panel, the flexible circuit board being adhered to a rear surface of the electroluminescent panel by the adhesive.

3. The electroluminescent panel-attached electronic device according to claim 2, wherein the electroluminescent panel is flexible.

4. The electroluminescent panel-attached electronic device according to claim 1, wherein the electroluminescent panel has an electroluminescent layer formed by diffusing fluorescent material powder into a dielectric layer, and a pair of electrodes holding therebetween the electroluminescent layer, the electroluminescent layer being selectively formed on the display panel and the operation switch.

5. The electroluminescent panel-attached electronic device according to claim 1, wherein the display panel is a liquid crystal display panel which includes a pair of substrates, each having electrodes and liquid crystal sealed therebetween.

6. The electroluminescent panel-attached electronic device according to claim 5, wherein the pair of substrates of the liquid crystal display panel are flexible electrode substrates obtained by forming electrodes on flexible films.

7. The electroluminescent panel-attached electronic device according to claim 1, wherein the electronic device is a cellular phone.

* * * * *